Jan. 4, 1966   D. D. FUGITT, SR   3,227,467
REVERSIBLE CHAIR AND WHEELED CART
Filed May 6, 1964                      2 Sheets-Sheet 1

INVENTOR
Daniel D. Fugitt, Sr.

BY  *Cecil L. Wood*

ATTORNEY

Jan. 4, 1966     D. D. FUGITT, SR     3,227,467
REVERSIBLE CHAIR AND WHEELED CART
Filed May 6, 1964                 2 Sheets-Sheet 2

INVENTOR
Daniel D. Fugitt, Sr.

BY
ATTORNEY

United States Patent Office 3,227,467
Patented Jan. 4, 1966

3,227,467
REVERSIBLE CHAIR AND WHEELED CART
Daniel Dee Fugitt, Sr., P.O. Box 291, Lewisville, Tex.
Filed May 6, 1964, Ser. No. 365,448
1 Claim. (Cl. 280—47.25)

This invention relates to a combined wheeled chair and cart, and it concerns more particularly a wheeled device which is characterized by its versatility and which is adapted for general use either as a chair or as a cart.

In one form thereof the invention contemplates a wheeled chair suitable for use at a lawn chair or a deck chair, and having back and bottom portions which are interchangeable upon rotative movement of the chair about the axis of its wheels, the chair likewise having two pairs of handles, useful also as legs, corresponding to said back and bottom portions, respectively.

The arrangement above described enables the position of the chair to be reversed, so that it faces in the opposite direction, by rotative movement of the chair about the axis of its wheels whereby its back portion is interchangeable with its bottom portion and its handles are interchangeable with its legs.

The invention further contemplates use of the wheeled chair as described as a cart or wheel barrow, the arrangement being such that the cart is turned around, whereby it faces in the opposite direction, upon rotating it about the axis of its wheels.

In another form thereof the invention contemplates a similar arrangement in which the wheeled chair or cart has a single handle or leg, depending on its rotative position relative to the axis of its wheels, corresponding to one of its back or bottom portions, as the case may be, and in which said single handle or leg advantageously may be employed, in conjunction with a suitable trailer hitch, for connecting the wheeled chair or cart to a bicycle or other device whereby it is adapted to be towed.

The invention also contemplates a further modification of the wheeled chair and cart in which its back portion is foldable upon its bottom portion for convenience in storing it.

The invention will be readily understood by referring to the following description and the accompanying drawing, in which.

Figure 1:
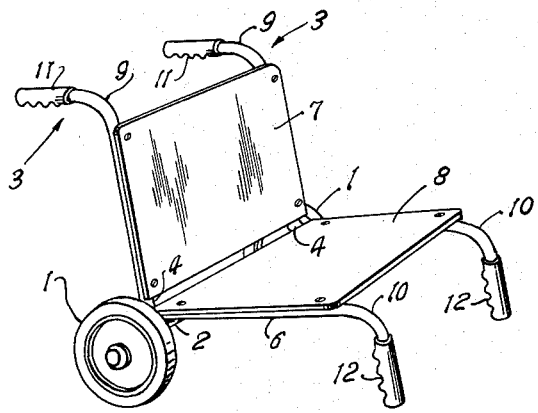
FIGURE 1 is a perspective view of a combined wheeled chair and cart embodying the invention in one of its operative positions, showing the top, front, and one side thereof.
Figure 2:
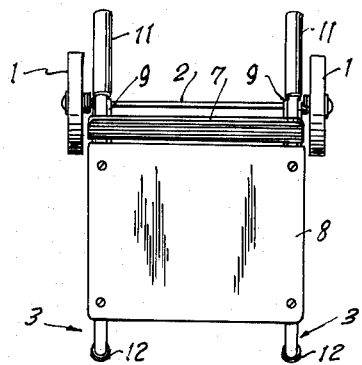
FIGURE 2 is a top plan view of the combined wheeled chair and cart as shown in FIGURE 1.

Referring to the combined wheeled chair and cart of the invention as illustrated in FIGURES 1 to 6 of the drawing, the device shown includes a pair of wheels, designated generally by the numerals 1, which are journaled on opposite ends of an axle, indicated generally by the numeral 2.

The device further includes a pair of elongated tubular frame members, designated generally by the numerals 3, which are arranged along opposite sides thereof. The tubular frame members 3 are bent right angularly substantially equidistantly from its ends, as at 4, to form end portions 5, 6, which extend substantially vertically and horizontally, as shown in FIGURE 1, and are connected by planar members 7, 8 which comprise the back and the bottom, respectively, of the device when used as a chair, in the position shown. The tubular frame members 3 are also bent right angularly near their opposite ends, as at 9, 10 to form a pair of rearwardly extending end portions 11 and a pair of downwardly extending end portions 12, each of which has a hand grip thereon, for use as handles and as legs, respectively, in the position shown. The tubular frame members 3 are connected intermediate their ends, by a pair of straps 13, to the axle 2.

Figure 3:
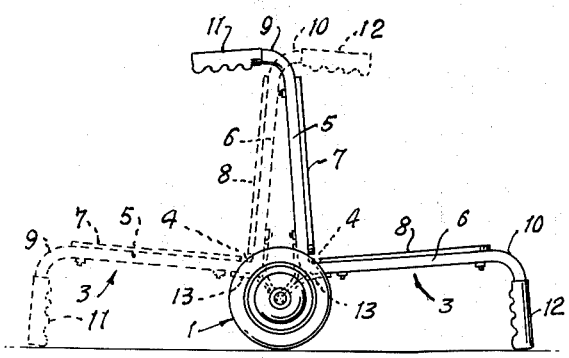
FIGURE 3 is a side elevational view thereof, showing in dotted lines a reversed position of the device in which it is rotated about the axis of its wheels whereby the front thereof faces upwardly and its top faces rearwardly.
Figure 4:
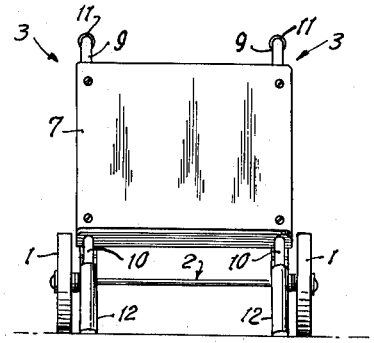
FIGURE 4 is a front elevational view.
Figure 5:
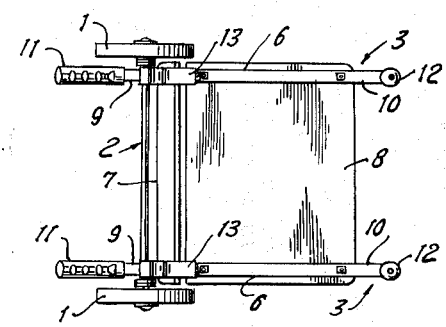
FIGURE 5 is a bottom plan view.
Figure 6:
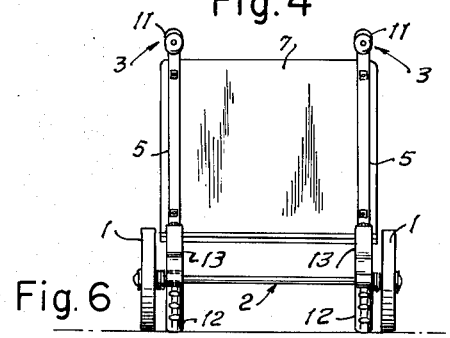
FIGURE 6 is a rear elevational view.

As shown in FIGURE 3, the chair or cart is rotated about the axis of the wheels 1 whereby the relative positions of the planar members 7, 8, which comprise the back and the bottom of the chair, respectively, as well as the relative positions of the handles 11 and the legs 12, are reversed.

Figures 7, 8:
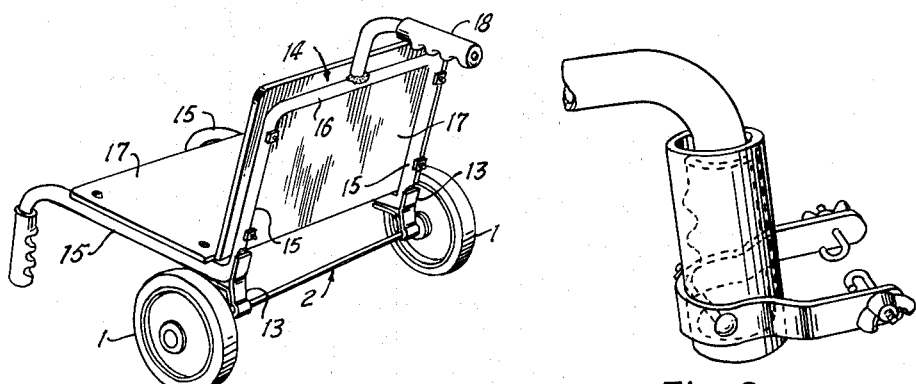
FIGURE 7 is a perspective view of a combined wheeled chair and cart embodying the invention in modified form.
FIGURE 8 is a fragmentary perspective view on an enlarged scale showing a trailer hitch arrangement for towing the combined wheeled chair and cart illustrated in FIGURE 7.
Figure 9:
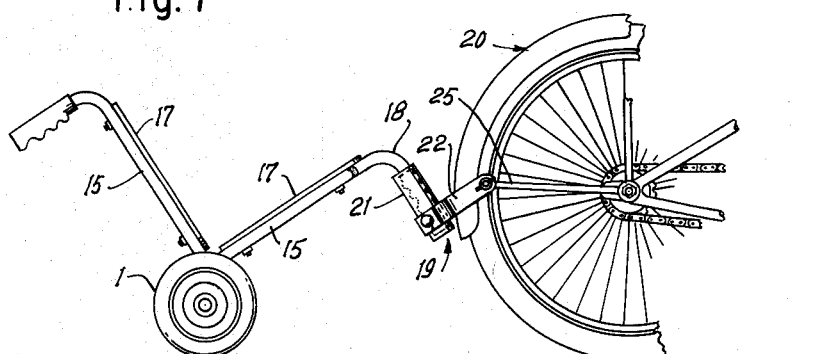
FIGURE 9 is a side elevational view showing the combined wheeled chair and cart illustrated in FIGURE 7 in towing position relative to a bicycle, shown fragmentarily, to which it is connected by the trailer hitch shown in FIGURE 8, whereby the combined wheeled chair and cart of the invention is adapted to be towed by the bicycle.

As shown in FIGURES 7 and 9, an elongated tubular frame member 14, which is formed in one piece, has opposite end portions 15, each corresponding to one of the elongated tubular frame members 3 shown in FIGURES 1 to 6, arranged along opposite sides thereof. The end portions 15 are connected by an intermediate portion 16 which is arranged transversely of the chair or cart, along an outer edge of a planar member 17 which corresponds to one of the planar members 7, 8 and has a single handle or leg 18, which corresponds to one of the handles or legs 11, 12, connected thereto.

FIGURES 8 and 9 show a trailer hitch arrangement, designated generally by the numeral 19, whereby the wheeled chair or cart is connected to a bicycle, shown fragmentarily and indicated generally by the numeral 20, whereby it is adapted to be towed.

The trailer hitch 19 includes a sleeve 21 which forms a socket for the single handle or leg 18 of the wheeled chair or cart, which is received therein, and a strap 22 which is bent 180 degrees intermediate its ends and embraces the sleeve 21, to which it is connected by a bolt 23. The strap 22 has hooks 24 passed through its opposite end portions for clamping engagement with a fender brace 25 of the bicycle 20. The hooks 24 have threaded shank portions to which wing nuts 26 are applied.

Figures 10, 11, 12:
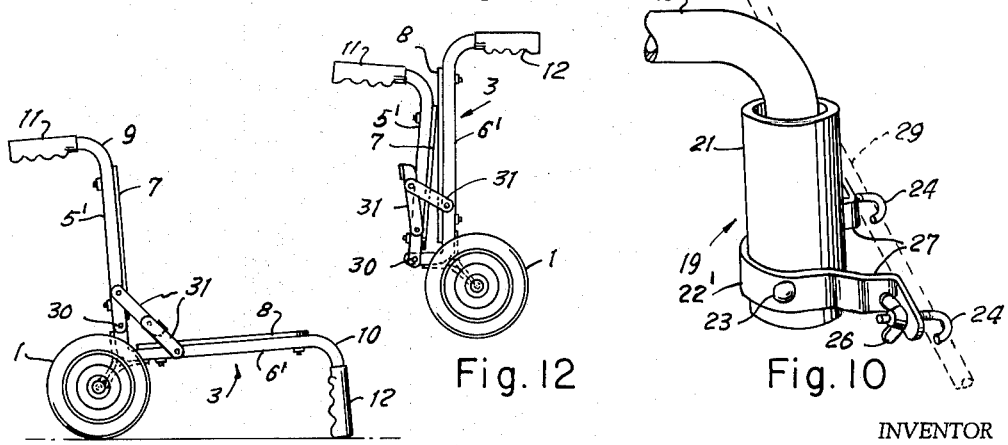
FIGURE 10 is a fragmentary perspective view on an enlarged scale showing a modified form of the trailer hitch illustrated in FIGURES 8 and 9.
FIGURE 11 is a side elevational view of another form of the invention, showing the combined wheeled chair and cart in its unfolded position.
FIGURE 12 is a view similar to FIGURE 11, showing the combined wheeled chair and cart in its folded position.

FIGURE 10 shows a modification of the trailer hitch arrangement 19 shown in FIGURES 8 and 9 in which the opposite end portions of the strap 22' are bent right angularly, as at 27, and are slotted, as at 28, for engagement by the hooks 24, whereby the trailer hitch 19 may be adjustably connected to a bar or other device, shown in dotted lines and indicated by the numeral 29, whereby the wheeled chair or cart of the invention is adapted to be towed.

FIGURES 11 and 12 show a modification of the arrangement shown in FIGURES 1 to 6 in which corresponding end portions 5′, 6′ of the respective elongated tubular members 3 are pivotally connected to the remainder thereof, as at 30, whereby the wheeled chair or cart may be folded, as illustrated in FIGURE 12. The device is secured in its unfolded position, as illustrated in FIGURE 11, by a pair of links 31 which are hinged to each other at one end and have their opposite ends hinged to opposite end portions 5′, 6′ of the respective elongated tubular members 3.

The invention may be modified in various ways without departing from the spirit and scope thereof.

What is claimed is:

A wheeled device, adapted for use either as a chair or as a cart, comprising an axle having a pair of wheels journaled on opposite ends thereof, a pair of elongated tubular members each bent right angularly intermediate its ends and having its right angularly bent intermediate portion fulcrumed on the axle, a pair of planar members connecting corresponding end portions of the respective elongated tubular members in parallel, spaced apart relation to each other and serving as a back and as a bottom, respectively, for the device when used as a chair, in one of its rotative positions relative to the axis of its wheels, a pair of right angularly bent extensions of the respective elongated tubular members on adjacent ends thereof for use as handles, or alternatively, as legs, depending on the rotative position of the device relative to the axis of its wheels, and at least one right angularly bent extension of the elongated tubular members on the ends thereof opposite said first mentioned ends for use as handles, or alternatively, as legs, and a trailer hitch including a sleeve forming a socket for one of said last mentioned right angularly bent extensions, and having clamping means for attachment of the sleeve to a bicycle or other means whereby the device is adapted to be towed.

References Cited by the Examiner

UNITED STATES PATENTS

| | | | |
|---|---|---|---|
| 639,338 | 12/1899 | Barns | 280—47.18 |
| 1,150,964 | 8/1915 | Phelps | 280—47.18 |
| 2,065,233 | 12/1936 | Mallett | 280—47.25 X |
| 2,468,894 | 1/1949 | Peek | 280—514 X |
| 2,674,302 | 4/1954 | McMorran et al. | 297—1 |
| 2,725,242 | 11/1955 | Peplin | 280—47.18 X |
| 2,778,654 | 1/1957 | Gottlieb | 280—47.19 X |
| 2,835,503 | 5/1958 | Humphries et al. | 280—47.19 |
| 2,953,388 | 9/1960 | Keller et al. | 280—47.24 |
| 2,992,011 | 7/1961 | Becan | 280—36 |

FOREIGN PATENTS

| | | |
|---|---|---|
| 605,315 | 8/1934 | Germany. |

KENNETH H. BETTS, *Primary Examiner.*